(12) United States Patent
Sugimoto

(10) Patent No.: US 11,359,556 B2
(45) Date of Patent: Jun. 14, 2022

(54) DEVICE AND METHOD FOR DETECTING MISFIRE IN INTERNAL COMBUSTION ENGINE

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/408,488

(22) Filed: Aug. 23, 2021

(65) Prior Publication Data
US 2022/0099037 A1 Mar. 31, 2022

(30) Foreign Application Priority Data
Sep. 25, 2020 (JP) .............................. JP2020-160652

(51) Int. Cl.
*F02D 35/02* (2006.01)
*F02D 41/00* (2006.01)
*F02D 41/24* (2006.01)

(52) U.S. Cl.
CPC ......... *F02D 35/028* (2013.01); *F02D 41/009* (2013.01); *F02D 41/2429* (2013.01); *F02D 2200/101* (2013.01); *F02D 2200/1002* (2013.01)

(58) Field of Classification Search
CPC ........ F02D 35/02; F02D 35/028; F02D 41/00; F02D 41/009; F02D 41/2429; F02D 2200/1002; F02D 2200/101; G06F 19/00
USPC ......... 123/339.1–339.29, 432–434; 701/110, 701/112, 113
See application file for complete search history.

(56) References Cited

U.S. PATENT DOCUMENTS

| | | | |
|---|---|---|---|
| 5,309,756 A | 5/1994 | Osawa et al. | |
| 2018/0246011 A1* | 8/2018 | Katayama | .............. G01M 15/11 |
| 2018/0275017 A1* | 9/2018 | Katayama | ............... F02D 41/28 |
| 2020/0271069 A1* | 8/2020 | Muto | .................. F02D 41/1454 |
| 2020/0309054 A1* | 10/2020 | Anzawa | .............. F02D 41/1498 |

FOREIGN PATENT DOCUMENTS

| | | |
|---|---|---|
| JP | H560004 A | 3/1993 |
| JP | 2009138663 A | 6/2009 |

* cited by examiner

*Primary Examiner* — John Kwon
*Assistant Examiner* — Johnny H Hoang
(74) *Attorney, Agent, or Firm* — Hauptman Ham, LLP

(57) ABSTRACT

A misfire detection device includes processing circuitry configured to execute a stopping process stopping combustion control of an air-fuel mixture in one or more cylinders and a determination process determining whether a misfire has occurred based on a value of a determination subject rotation fluctuation amount, that is, a rotation fluctuation amount of a determination subject cylinder for misfire. A comparison subject rotation fluctuation amount is a rotation fluctuation amount corresponding to a crank angle separated by a predetermined angular interval from a crank angle corresponding to the determination subject rotation fluctuation amount. The determination process includes a process determining the misfire based on a value of the determination subject rotation fluctuation amount when the predetermined angular interval equals an angular interval between crank angles at which compression top dead center appears in the one or more of the cylinders and the determination subject cylinder during the stopping process.

10 Claims, 7 Drawing Sheets

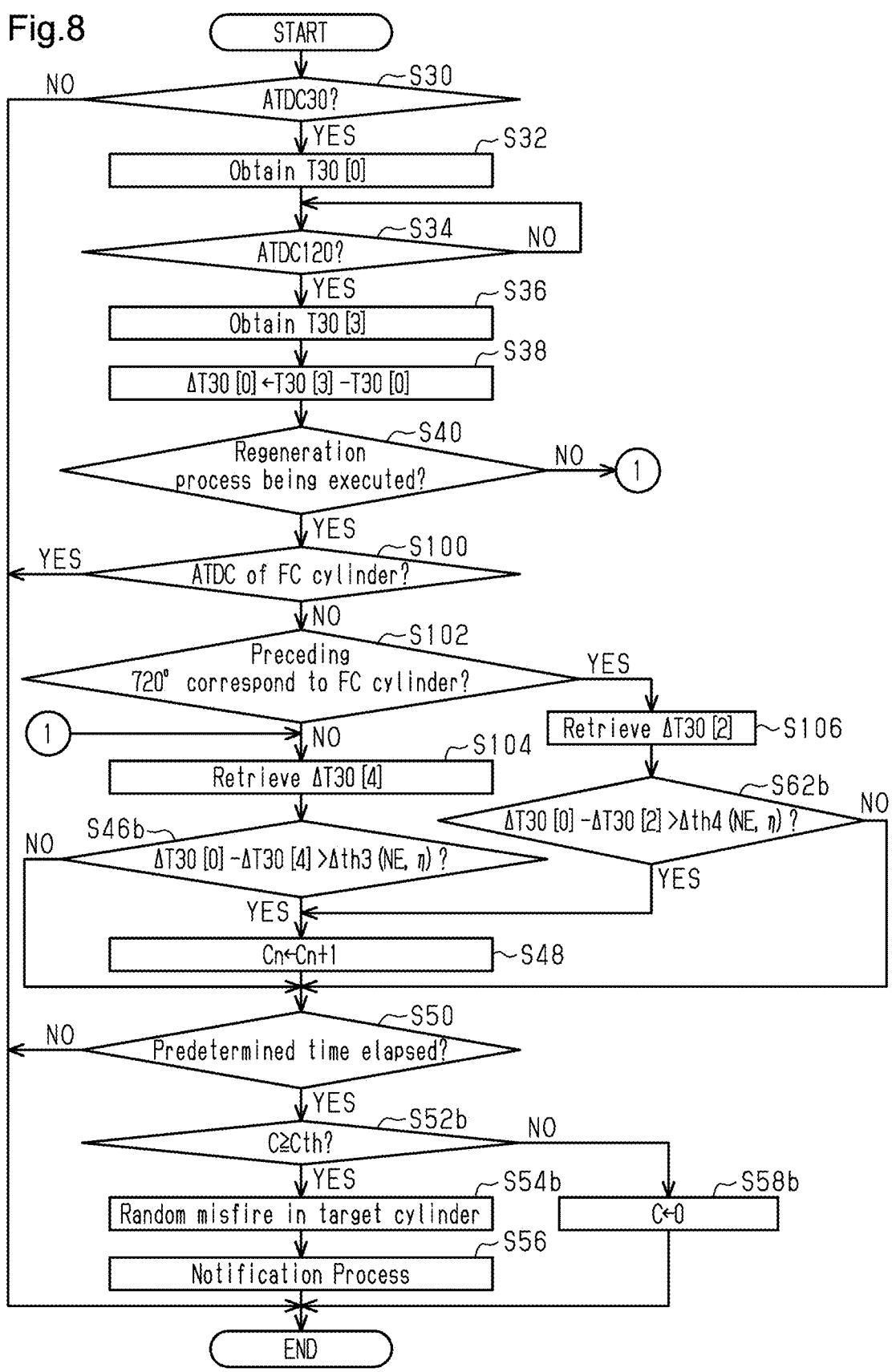

DEVICE AND METHOD FOR DETECTING MISFIRE IN INTERNAL COMBUSTION ENGINE

RELATED APPLICATIONS

The present application claims priority of Japanese Application Number 2020-160652 filed on Sep. 25, 2020, the disclosure of which is hereby incorporated by reference herein in its entirety.

BACKGROUND

1. Field

The following description relates to a device and a method for detecting a misfire in an internal combustion engine.

2. Description of Related Art

Japanese Laid-Open Patent Publication No. 2009-138663 describes an example of a misfire detection device that detects whether a misfire has occurred based on a rotation fluctuation amount, which is specified by a difference in instantaneous rotation speed between different regions. The instantaneous rotation speed is a rotation speed of the crankshaft in an angular range that is less than an interval between appearances of compression top dead center. More specifically, whether a misfire has occurred is determined based on a difference between a threshold value and a difference between rotation fluctuation amounts obtained at points separated from each other by 360° C.A. In this configuration, the threshold value is not directly compared with a target rotation fluctuation amount and is instead compared with a value obtained by subtracting a rotation fluctuation amount corresponding to the preceding 360° C.A from the target rotation fluctuation amount. This limits the effects caused by manufacturing variations in crank angle sensors and the like (paragraph [0003]).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

When shaft torque of the internal combustion engine is not zero, in order for a post-processing device to execute a regeneration process, unburned fuel and oxygen may be supplied to the emission by stopping execution of combustion control on some of the cylinders and setting the air-fuel ratio of the remaining cylinders to be richer than the stoichiometric air-fuel ratio. However, in this case, if the rotation fluctuation amount corresponding to the preceding 360° C.A is calculated based on the instantaneous rotation speed corresponding to the above-described some of the cylinders, an erroneous determination of a misfire may result.

Aspects of the present disclosure and their operation and advantages are as follows.

Aspect 1. An aspect of the present disclosure provides a misfire detection device for an internal combustion engine including cylinders. The misfire detection device includes processing circuitry. The processing circuitry is configured to execute a stopping process that stops combustion control of an air-fuel mixture in one or more of the cylinders and a determination process that determines whether a misfire has occurred based on a value of a determination subject rotation fluctuation amount. The determination subject rotation fluctuation amount is a rotation fluctuation amount related to a determination subject cylinder, which is one of the cylinders that is subject to determination of whether a misfire has occurred. A comparison subject rotation fluctuation amount is a rotation fluctuation amount corresponding to a crank angle that is separated by a predetermined angular interval from a crank angle corresponding to the determination subject rotation fluctuation amount. The determination process includes a process that determines whether a misfire has occurred based on a relative value of the determination subject rotation fluctuation amount to the comparison subject rotation fluctuation amount, and a process that determines whether the misfire has occurred based on a value of the determination subject rotation fluctuation amount instead of based on the relative value of the determination subject rotation fluctuation amount to the comparison subject rotation fluctuation amount when the predetermined angular interval equals an angular interval between a crank angle at which compression top dead center of the one or more of the cylinders appears and a crank angle at which compression top dead center of the determination subject cylinder appears during the stopping process. The predetermined angular interval is an integer multiple of an angular interval corresponding to one rotation of a crankshaft. The rotation fluctuation amount is a change amount of an instantaneous speed variable. The instantaneous speed variable is a variable indicating speed of the crankshaft when rotating in a rotation angle range that is less than or equal to an interval between crank angles at which compression top dead center appears.

The configuration described above determines whether a misfire has occurred based on the relative value of the rotation fluctuation amount of the subject of the determination to the rotation fluctuation amount that is separated by the predetermined angular interval, which is an integer multiple of one rotation of the crankshaft. This limits an error caused by the tolerance of crank signals used in calculation of the instantaneous speed variable. However, when the rotation fluctuation amount separated by the predetermined rotation angular interval is used to limit an error caused by the tolerance, normal combustion has to be performed in the cylinder separated by the predetermined rotation angular interval.

In this regard, when the stopping process is executed on the cylinder having compression top dead center, the angle of which differs by the predetermined angular interval from that of the subject of the misfire determination, whether a misfire has occurred is determined based on the value of the rotation fluctuation amount related to the subject of the determination without based on a value relative to the rotation fluctuation amount separated by the predetermined angular interval. This limits the effect of the rotation fluctuation amount caused by the stopping process, thereby limiting decreases in the accuracy of the misfire determination caused by the stopping process.

Aspect 2. In the misfire detection device according to aspect 1, the determination process may include a process that determines whether the misfire has occurred based on comparison of the value of the determination subject rotation fluctuation amount with a determination value when the predetermined angular interval equals an angular interval between a crank angle at which compression top dead center of the one or more of the cylinders appears and a crank angle at which compression top dead center of the determination subject cylinder appears during the stopping process.

In the configuration described above, whether a misfire has occurred is determined based on comparison of the determination value with the rotation fluctuation amount related to the subject of the determination. Thus, the determination of whether a misfire has occurred is performed without being affected by the rotation fluctuation amount caused by the stopping process.

Aspect 3. In the misfire detection device according to aspect 2, the processing circuitry may be configured to execute the stopping process on condition that torque of the internal combustion engine is greater than or equal to a predetermined value.

When torque of the internal combustion engine is relatively large, decreases in the accuracy of the misfire determination caused by the tolerance tend to be less than when the torque is relatively small. Hence, when the torque is greater than or equal to the predetermined value and the stopping process is executed, the accuracy of determining whether a misfire has occurred based on comparison of the rotation fluctuation amount with the determination value is subtly decreased by the tolerance. Therefore, even when it is determined whether a misfire has occurred based on comparison of the value of the rotation fluctuation amount with the determination value during the stopping process, decreases in the accuracy of the misfire determination are appropriately limited.

Aspect 4. In the misfire detection device according to aspect 1, a specified angle rotation fluctuation amount is a rotation fluctuation amount corresponding to a crank angle that is separated by a specified angular interval from a crank angle corresponding to the determination subject rotation fluctuation amount. The determination process may include a process that determines whether the misfire has occurred based on comparison of a determination value with a relative value of the determination subject rotation fluctuation amount to the specified angle rotation fluctuation amount when the predetermined angular interval equals an angular interval between a crank angle at which compression top dead center of the one or more of the cylinders appears and a crank angle at which compression top dead center of the determination subject cylinder appears during the stopping process. The specified angular interval is an integer multiple of an interval between crank angles at which compression top dead center appears and differs from an integer multiple of an angular interval corresponding to one rotation of the crankshaft.

The period of torque fluctuation of the internal combustion engine is likely to be the interval between appearances of compression top dead center. Therefore, a rotation fluctuation amount separated from the rotation fluctuation amount related to the subject of the determination by an integer multiple of the interval between appearances of compression top dead center may have the same period of torque fluctuation as the rotation fluctuation amount related to the subject of the determination. In this regard, in the configuration described above, the determination value is compared with the relative value of the rotation fluctuation amount related to the subject of the determination to the rotation fluctuation amount separated by the specified angular interval, so that whether a misfire has occurred is determined while limiting the effect of the stopping process.

Aspect 5. In the misfire detection device according to aspect 4, the processing circuitry may be configured to execute a learning process when combustion control of the internal combustion engine is stopped and the crankshaft is rotating. A learning rotation fluctuation amount is a rotation fluctuation amount related to a cylinder, the compression top dead center of which appears at a crank angle that is separated by the predetermined angular interval from a crank angle at which compression top dead center of the one or more of the cylinders appears. A learning specified angle rotation fluctuation amount is a rotation fluctuation amount corresponding to a crank angle that is separated by the specified angular interval from a crank angle corresponding to the learning rotation fluctuation amount. The learning process includes learning a difference between the learning rotation fluctuation amount and the learning specified angle rotation fluctuation amount. The determination process may include a correction process that corrects at least one of the determination value or the relative value of the determination subject rotation fluctuation amount to the specified angle rotation fluctuation amount in accordance with the difference learned by the learning process when the predetermined angular interval equals an angular interval between a crank angle at which compression top dead center of the one or more of the cylinders appears and a crank angle at which compression top dead center of the determination subject cylinder appears during the stopping process, and a process that determines whether the misfire has occurred based on comparison of the determination value with the relative value of the determination subject rotation fluctuation amount to the specified angle rotation fluctuation amount after the correction process is executed.

Even when a rotation fluctuation amount is separated from the rotation fluctuation amount related to the subject of the determination by an integer multiple of the interval between appearances of compression top dead center, the rotation fluctuation amount will not receive the same effect by the tolerance as the rotation fluctuation amount related to the subject of the determination unless it is an integer multiple of one rotation of the crankshaft.

In this regard, when the combustion control of the internal combustion engine is stopped, the configuration described above executes a learning process that learns the difference between the rotation fluctuation amount separated from compression top dead center of some of the cylinders by the predetermined angular interval and the rotation fluctuation amount separated by the specified angle. The learned result of the learning process reflects the difference in the effect by the tolerance imposed on the two rotation fluctuation amounts. Thus, when at least one of the determination value or the rotation fluctuation amount related to the subject of the determination is corrected in accordance with the learned difference, whether a misfire has occurred is determined while limiting the effect of the tolerance.

Aspect 6. In the misfire detection device according to aspect 5, the predetermined angular interval is an angular interval corresponding to one rotation of the crankshaft, and the specified angular interval may be less than the predetermined angular interval.

In the configuration described above, the specified angular interval is less than the predetermined angular interval. This allows the rotation fluctuation amount of the subject of the comparison with the rotation fluctuation amount related to the subject of the determination to be temporally close to the rotation fluctuation amount related to the subject of the determination. This limits effects of a low frequency component of changes in rotation speed of the crankshaft imposed on the misfire determination.

Aspect 7. In the misfire detection device according to aspect 1, a specified angle rotation fluctuation amount is a rotation fluctuation amount corresponding to a crank angle that is separated by a specified angular interval from a crank angle corresponding to the determination subject rotation fluctuation amount. The determination process may include a process that determines whether the misfire has occurred based on comparison of a determination value with a relative value of the determination subject rotation fluctuation amount to the specified angle rotation fluctuation amount when the predetermined angular interval equals an angular interval between a crank angle at which compression top dead center of the one or more of the cylinders appears and a crank angle at which compression top dead center of the determination subject cylinder appears during the stopping process. The specified angular interval may be an angular interval that is an integer multiple of an angular interval corresponding to one rotation of the crankshaft and differs from the predetermined angular interval.

In the configuration described above, the specified angular interval is an integer multiple of one rotation of the crankshaft and differs from the predetermined angular interval. This allows the rotation fluctuation amount of the subject of the comparison with the rotation fluctuation amount related to the subject of the determination to receive the same level of the effect by the tolerance as the rotation fluctuation amount related to the subject of the determination while limiting the effect of the stopping process.

Aspect 8. In the misfire detection device according to aspect 8, the predetermined angular interval may be an angular interval corresponding to two rotations of the crankshaft, and the specified angular interval may be an angular interval corresponding to one rotation of the crankshaft.

In the configuration described above, the specified angular interval is less than the predetermined angular interval. This allows the rotation fluctuation amount of the subject of the comparison with the rotation fluctuation amount related to the subject of the determination to be temporally close to the rotation fluctuation amount related to the subject of the determination. This limits effects of a low frequency component of changes in rotation speed of the crankshaft imposed on the misfire determination.

Aspect 9. In the misfire detection device according to aspect 8, the stopping process may include a process that changes the one or more of the cylinders.

When the one or more of the cylinders are changed, a cylinder that was not the subject of the stopping process in the previous combustion cycle may become the subject of the stopping process. In this case, when the predetermined angular interval is one combustion cycle and the subject of the stopping process changes, the rotation fluctuation amount preceded by the predetermined angular interval may be inappropriate for being used as the subject of the comparison. In this regard, in the configuration described above, in a case described above, the rotation fluctuation amount of the subject of the comparison is changed to the rotation fluctuation amount separated by the specified angular interval. This avoids a situation in which the rotation fluctuation amount of the subject of the comparison is the rotation fluctuation amount corresponding to the stopping process.

Aspect 10. An aspect of the present disclosure provides a misfire detection method for an internal combustion engine including cylinders. The misfire detection method includes executing a stopping process that stops combustion control of an air-fuel mixture in one or more of the cylinders, and executing a determination process that determines whether a misfire has occurred based on a determination subject rotation fluctuation amount, which is a rotation fluctuation amount related to a determination subject cylinder, which is one of the cylinders that is subject to determination of whether a misfire has occurred. A comparison subject rotation fluctuation amount is a rotation fluctuation amount corresponding to a crank angle that is separated by a predetermined angular interval from a crank angle corresponding to the determination subject rotation fluctuation amount. The determination process includes a process that determines whether a misfire has occurred based on a relative value of the determination subject rotation fluctuation amount to the comparison subject rotation fluctuation amount, and a process that determines whether the misfire has occurred based on a value of the determination subject rotation fluctuation amount instead of based on the relative value of the determination subject rotation fluctuation amount to the comparison subject rotation fluctuation amount when the predetermined angular interval equals an angular interval between a crank angle at which compression top dead center of the one or more of the cylinders appears and a crank angle at which compression top dead center of the determination subject cylinder appears during the stopping process. The predetermined angular interval is an integer multiple of an angular interval corresponding to one rotation of a crankshaft. The rotation fluctuation amount is a change amount of an instantaneous speed variable. The instantaneous speed variable is a variable indicating speed of the crankshaft when rotating in a rotation angle range that is less than or equal to an interval between crank angles at which compression top dead center appears.

Other features and aspects will be apparent from the following detailed description, the drawings, and the claims.

BRIEF DESCRIPTION OF THE DRAWINGS

FIG. 8 is a flowchart showing the procedure of a process related to misfire detection according to the third embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described below with reference to the drawings.

Figure 1:
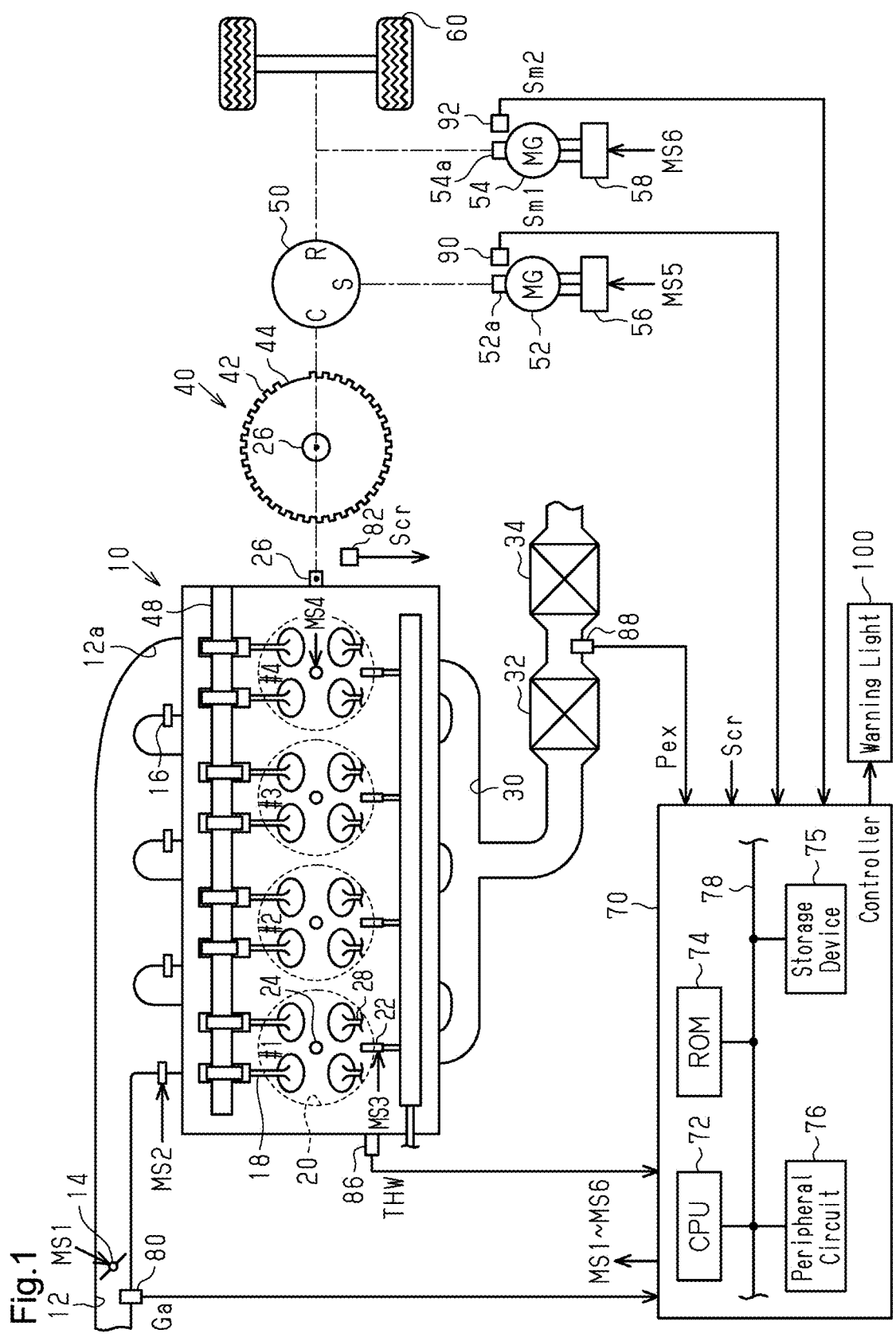
FIG. 1 is a diagram showing a drive system and a control system according to a first embodiment.

As shown in FIG. 1, an internal combustion engine 10 includes four cylinders, namely, cylinders #1 to #4. A throttle valve 14 is provided in an intake passage 12 of the internal combustion engine 10. The intake passage 12 has a downstream portion defining intake ports 12a. Each intake port 12a is provided with a port injection valve 16 that injects fuel into the intake port 12a. When an intake valve 18 opens, air drawn into the intake passage 12 and the fuel injected from the port injection valve 16 flow into a combustion chamber 20. A direct injection valve 22 injects fuel into the combustion chamber 20. An air-fuel mixture of the fuel and the air in the combustion chamber 20 is burned by spark discharge of an ignition plug 24. The combustion energy generated in this process is converted into rotational energy of a crankshaft 26.

The air-fuel mixture used for combustion in the combustion chamber 20 is discharged as exhaust to an exhaust passage 30 when an exhaust valve 28 opens. The exhaust passage 30 is provided with a three-way catalyst 32 having an oxygen storage capacity and a gasoline particulate filter 34 (GPF). In the present embodiment, it is assumed that the GPF 34 is a filter configured to collect particulate matter (PM) and supporting a three-way catalyst.

The crankshaft 26 is coupled to a crank rotor 40 including teeth 42. The teeth 42 indicate each rotation angle of the crankshaft 26. The teeth 42 are basically arranged on the crank rotor 40 at an interval of 10° C.A (crank angle). The crank rotor 40 includes a toothless portion 44, which is defined by a portion between adjacent ones of the teeth 42 that are separated by 30° C.A. This indicates a reference rotation angle of the crankshaft 26.

The crankshaft 26 is mechanically coupled to a carrier C of a planetary gear mechanism 50 configured to be a power-split device. The planetary gear mechanism 50 includes a sun gear S, which is mechanically coupled to a rotation shaft 52a of a first motor generator 52. The planetary gear mechanism 50 also includes a ring gear R, which is mechanically coupled to a rotation shaft 54a of a second motor generator 54 and driving wheels 60. The first motor generator 52 has a terminal to which alternating current voltage is applied by an inverter 56. The second motor generator 54 has a terminal to which alternating current voltage is applied by an inverter 58.

The internal combustion engine 10 is controlled by a controller 70, which operates operating units of the internal combustion engine 10 such as the throttle valve 14, the port injection valves 16, the direct injection valves 22, and the ignition plugs 24, to control the control aspects of the internal combustion engine 10 such as torque and an exhaust component ratio. The controller 70 also controls the first motor generator 52 and operates the inverter 56 to control rotation speed, which is a control aspect of the first motor generator 52. The controller 70 also controls the second motor generator 54 and operates the inverter 58 to control torque, which is a control aspect of the second motor generator 54. FIG. 1 shows operating signals MS1 to MS6 of the throttle valve 14, the port injection valves 16, the direct injection valves 22, the ignition plugs 24, and the inverters 56 and 58, respectively. To control the control aspects of the internal combustion engine 10, the controller 70 refers to an intake air amount Ga that is detected by an airflow meter 80, an output signal Scr of a crank angle sensor 82, a water temperature THW that is detected by a water temperature sensor 86, and pressure Pex of the exhaust flowing into the GPF 34 that is detected by an exhaust pressure sensor 88. In addition, to control the control aspects of the first motor generator 52 and the second motor generator 54, the controller 70 refers to an output signal Sm1 of a first rotation angle sensor 90, which detects a rotation angle of the first motor generator 52, and an output signal Sm2 of a second rotation angle sensor 92, which detects a rotation angle of the second motor generator 54.

The controller 70 includes a central processing unit 72 (CPU), a read-only memory 74 (ROM), a storage device 75, and a peripheral circuit 76, which are configured to communicate with each other through a communication line 78. The peripheral circuit 76 includes a circuit that generates a clock signal regulating an internal operation, a power supply circuit, a reset circuit, and the like. The controller 70 controls the control aspects by causing the CPU 72 to execute programs stored in the ROM 74.

Figure 2:
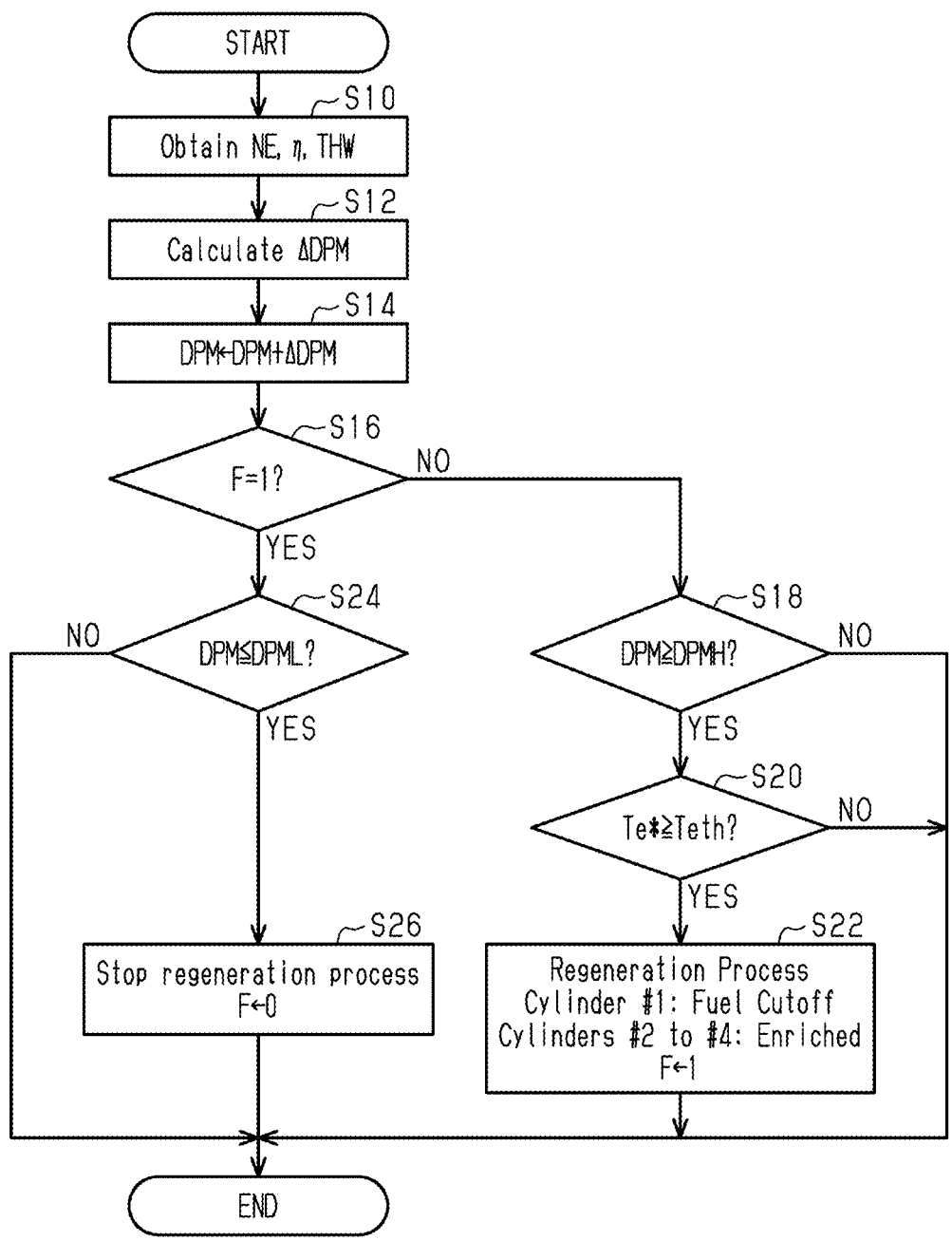
FIG. 2 is a flowchart showing the procedure of a process related to gasoline particulate filter (GPF) regeneration according to the first embodiment.

FIG. 2 shows the procedure of a process executed by the controller 70 in the present embodiment. The process shown in FIG. 2 is implemented by the CPU 72, for example, repeatedly executing a program stored in the ROM 74 in a predetermined cycle. In the following description, the step number of each process is represented by a numeral provided with an "S" prefix.

In a series of processes shown in FIG. 2, the CPU 72 first obtains engine speed NE, a charging efficiency η, and the water temperature THW (S10). The engine speed NE is calculated by the CPU 72 based on the output signal Scr. The charging efficiency η is calculated by the CPU 72 based on the intake air amount Ga and the engine speed NE. Then, the CPU 72 calculates an update amount ΔDPM of a deposition amount DPM, which is an amount of PM collected on the GPF 34, based on the engine speed NE, the charging efficiency η, and the water temperature THW (S12). The CPU 72 calculates the amount of PM included in the emission discharged to the exhaust passage 30 based on the engine speed NE, the charging efficiency η, and the water temperature THW. The CPU 72 calculates the temperature of the GPF 34 based on the engine speed NE and the charging efficiency η. The CPU 72 calculates the update amount ΔDPM based on the amount of PM in the emission and the temperature of the GPF 34.

Then, the CPU 72 updates the deposition amount DPM in accordance with the update amount ΔDPM (S14). The CPU 72 determines whether a flag F is one (S16). The flag F being one indicates that a regeneration process for burning and removing PM from the GPF 34 is being executed. The flag F being zero indicates that regeneration process is not being executed. If the CPU 72 determines that the flag F is zero (S16: NO), the CPU 72 determines whether the deposition amount DPM is greater than or equal to a regeneration execution value DPMH (S18). The regeneration execution value DPMH is set to a value at which the GPF 34 has collected a large amount of PM and needs removal of PM. If the CPU 72 determines that the deposition amount DPM is greater than or equal to the regeneration execution value DPMH (S18: YES), the CPU 72 determines whether an engine torque instruction value Te*, that is, an instruction value of torque for the internal combustion engine 10, is greater than or equal to a predetermined value Teth (S20). This process determines whether to permit execution of the regeneration process.

If the CPU 72 determines that the engine torque instruction value Te* is greater than or equal to the predetermined value Teth (S20: YES), the CPU 72 executes the regeneration process and assigns one to the flag F (S22). More specifically, the CPU 72 stops injections from the port injection valve 16 and the direct injection valve 22 of the cylinder #1 and sets the air-fuel ratio of the air-fuel mixture in the combustion chambers 20 of the cylinders #2 to #4 to be richer than the stoichiometric air-fuel ratio. This process discharges oxygen and unburned fuel to the exhaust passage 30 so that the temperature of the GPF 34 is increased to burn and remove the PM collected on the GPF 34. More specifically, by discharging oxygen and unburned fuel to the exhaust passage 30, the unburned fuel is burned in the three-way catalyst 32 and the like and, ultimately, increases the temperature of the GPF 34. In addition, by supplying oxygen to the GPF 34, the PM collected on the GPF 34 is burned and removed.

If the CPU 72 determines that the flag F is one (S16: YES), the CPU 72 determines whether the deposition amount DPM is less than or equal to a stopping threshold value DPML (S24). The stopping threshold value DPML is set to a value at which the amount of PM collected on the GPF 34 has been sufficiently reduced so that the regeneration process may be stopped. If the deposition amount DPM is less than or equal to the stopping threshold value DPML (S24: YES), the CPU 72 stops the regeneration process and assigns zero to the flag F (S26).

When the process of S22 or S26 is completed or a negative determination is made in the process of S18, S20, or S24, the CPU 72 temporarily ends the series of processes shown in FIG. 2.

Figure 3:
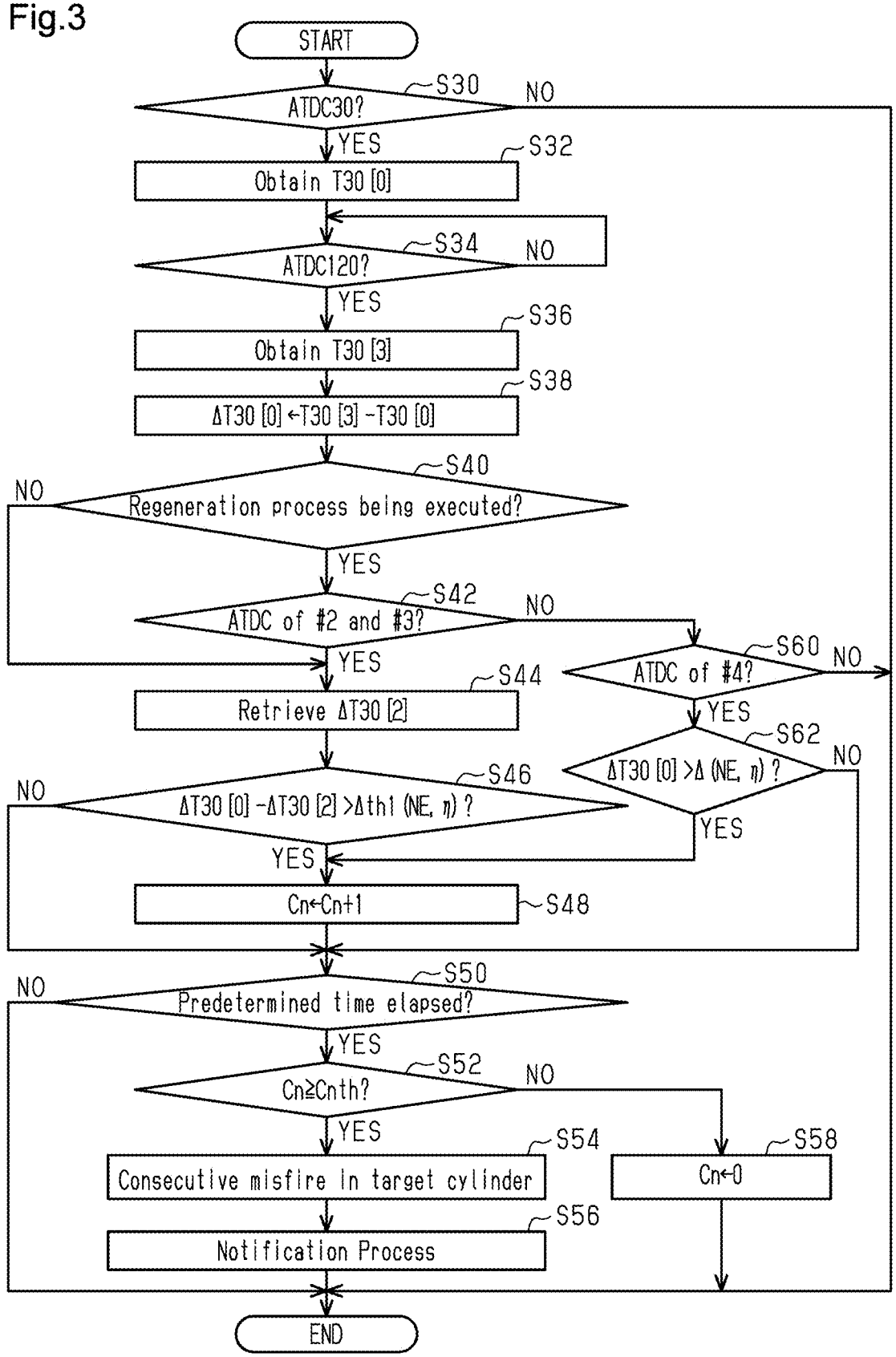
FIG. 3 is a flowchart showing the procedure of a process related to misfire detection according to the first embodiment.

FIG. 3 shows the procedure of another process executed by the controller 70. The process shown in FIG. 3 is implemented by the CPU 72, for example, repeatedly executing a program stored in the ROM 74 in a predetermined cycle.

In a series of the processes shown in FIG. 3, the CPU 72 first determines whether the present rotation angle of the crankshaft 26 is ATDC30° C.A from the reference, that is, compression top dead center of any one of the cylinders #1 to #4 (S30). Compression top dead center of a cylinder may refer to a crank angle corresponding to a point in time when the piston has reached compression top dead center in the cylinder. The term ATDC refers to after top dead center. If the CPU 72 determines that the present rotation angle of the crankshaft 26 is ATDC30° C.A (S30: YES), the CPU 72 obtains time T30[0] taken for the crankshaft 26 to rotate 30° C.A from the compression top dead center (S32). The CPU 72 waits until ATDC120° C.A is reached (S34: NO). If the CPU 72 determines that ATDC120° C.A is reached (S34: YES), the CPU 72 obtains time T30[3] taken for the crankshaft 26 to rotate from ATDC90° C.A to ATDC120° C.A (S36). The numeral in the parentheses following T30 is a variable that is increased by one in accordance with progress of every 30° C.A. The CPU 72 assigns a value obtained by subtracting time T30[0] from time T30[3] to a rotation fluctuation amount $\Delta$T30[0] related to the cylinder, the compression top dead center of which is detected by the process of S30 (S38). The rotation fluctuation amount $\Delta$T30 is a variable having a negative value when a misfire has not occurred in a cylinder that is subject to the misfire determination, and a positive value when a misfire has occurred in the cylinder. The CPU 72 stores the rotation fluctuation amount $\Delta$T30[0] in the storage device 75.

The CPU 72 determines whether the regeneration process is being executed (S40). If the CPU 72 determines that the regeneration process is being executed (S40: YES), the CPU 72 determines whether the cylinders #2 and #3 are in an ATDC period (S42). When the CPU 72 determines that the cylinders #2 and #3 are in the ATDC period (S42: YES) or a negative determination is made in the process of S40, the CPU 72 retrieves a rotation fluctuation amount $\Delta$T30[2], which corresponds to the preceding 360° C.A (S44). The rotation fluctuation amount $\Delta$T30[2] is the value stored in the storage device 75 by the process of S38 at the preceding 360° C.A. In this specification, for the sake of convenience, the numeral in the parentheses following the rotation fluctuation amount $\Delta$T30 is a variable that is increased by one at every preceding 180° C.A. The CPU 72 determines whether the value obtained by subtracting the rotation fluctuation amount $\Delta$T30[2] from the rotation fluctuation amount $\Delta$T30[0] is greater than a determination value $\Delta$th1 (S46). When a misfire has not occurred in the cylinder that is subject to the misfire determination, the rotation fluctuation amount $\Delta$T30[0] is approximately equal to the rotation fluctuation amount $\Delta$T30[2]. Therefore, the subtracted value is zero or close to zero. When a misfire has occurred in the cylinder subject to the misfire determination, the subtracted value is a relatively large positive value. The determination value $\Delta$th1 is set to a value that may conform to the subtracted value when a misfire has occurred.

Here, instead of the value of the rotation fluctuation amount $\Delta$T30[0] being compared with the determination value, a relative value of the rotation fluctuation amount $\Delta$T30[0] to the rotation fluctuation amount $\Delta$T30[2] is compared with the determination value $\Delta$th1. This eliminates effects caused by, for example, the tolerance of intervals between the teeth 42 of the crank rotor 40. More specifically, the rotation fluctuation amount $\Delta$T30[0] and the rotation fluctuation amount $\Delta$T30[2] are obtained at an interval of 360° C.A and thus are calculated with reference to the same tooth 42. Therefore, even when the teeth 42 have different intervals due to the tolerance, the rotation fluctuation amount $\Delta$T30[0] and the rotation fluctuation amount $\Delta$T30[2] are equally affected. Thus, when the relative value of the rotation fluctuation amount $\Delta$T30[0] to the rotation fluctuation amount $\Delta$T30[2] is compared with the determination value $\Delta$th1, the effect of the tolerance is limited.

The CPU 72 variably sets the determination value $\Delta$th1 using the engine speed NE and the charging efficiency $\eta$ as inputs (S46). More specifically, when the engine speed NE is relatively high, the CPU 72 sets the determination value $\Delta$th1 to a smaller value than when the engine speed NE is relatively low. Also, when the charging efficiency $\eta$ is relatively large, the CPU 72 sets the determination value $\Delta$th1 to be a larger value than when the charging efficiency $\eta$ is relatively small. This process is accomplished by the CPU 72 executing map calculation on the determination value $\Delta$th1 when the ROM 74 stores, in advance, map data in which the engine speed NE and the charging efficiency $\eta$ are input variables and the determination value $\Delta$th1 is an output variable.

The map data refers to a data set of discrete values of an input variable and values of an output variable corresponding to each value of the input variable. For example, when the value of an input variable matches any value of an input variable in the map data, the map calculation may use the corresponding value of an output variable in the map data as the calculation result. When the value of the input variable does not match any value of the input variable in the map data, the map calculation may use a value obtained by interpolating multiple values of the output variable included in the map data set as the calculation result.

If the CPU 72 determines that the subtracted value is greater than the determination value Δth1 (S46: YES), the CPU 72 increments a counter Cn (S48). The counter Cn includes respective counters C1 to C4 for the cylinders #1 to #4. However, in this specification, they are collectively referred to as "Cn". When the process of S48 is completed or a negative determination is made in the process of S46, the CPU 72 determines whether a predetermined period has elapsed from the later one of a point in time when the process of S46 is executed for the first time and a point in time when the process of S58 (described later) is executed (S50). If the CPU 72 determines that the predetermined period has elapsed (S50: YES), the CPU 72 determines whether the counter Cn is greater than or equal to a threshold value Cnth (S52). The threshold value Cnth is set in accordance with the number of times misfires consecutively occur in the same cylinder that is subject to the detection within the predetermined period. If the CPU 72 determines that the counter Cn is greater than or equal to the threshold value Cnth (S52: YES), the CPU 72 determines that misfires have consecutively occurred in the cylinder subject to the misfire detection (S54). Then, the CPU 72 operates a warning light 100 shown in FIG. 1 to execute a notification process that notifies the user of the consecutive misfires (S56).

If the CPU 72 determines that the counter Cn is less than the threshold value Cnth (S52: NO), the CPU 72 initializes the counter Cn (S58).

If a negative determination is made in the process of S42, the CPU 72 determines whether the cylinder #4 is in the ATDC period (S60). This process determines whether the rotation fluctuation amount ΔT30 calculated in the process of S38 is related to the cylinder #4. If the CPU 72 determines that the cylinder #4 is in the ATDC period (S60: YES), the CPU 72 determines whether the rotation fluctuation amount ΔT30[0] is greater than a determination value Δ (S62). More specifically, when the rotation fluctuation amount ΔT30[0] is related to the cylinder #4, the value of the rotation fluctuation amount ΔT30[0] is compared with the determination value Δ, instead of the relative value of the rotation fluctuation amount ΔT30[0] to the rotation fluctuation amount ΔT30[2], which corresponds to the preceding 360° C.A, being compared with the determination value Δth1. This is because the rotation fluctuation amount ΔT30[2] corresponding to the preceding 360° C.A is related to the cylinder #1, which is undergoing a fuel cutoff process.

Figure 4:
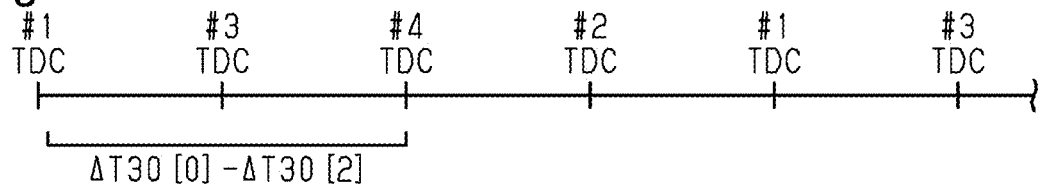
FIG. 4 is a flowchart showing an ignition sequence according to the first embodiment.

More specifically, as shown in FIG. 4, in the present embodiment, compression top dead center appears sequentially in the cylinder #1, the cylinder #3, the cylinder #4, and the cylinder #2. The cylinder, the compression top dead center of which precedes the compression top dead center of the cylinder #4 by 360° C.A, is the cylinder #1. Since the cylinder #1 is undergoing the fuel cutoff process, the rotation fluctuation amount is equivalent to that during occurrence of a misfire. Therefore, even when a misfire has not occurred in the cylinder #4, the rotation fluctuation amount ΔT30[0] greatly differs from the rotation fluctuation amount ΔT30[2].

The CPU 72 variably sets the determination value Δ using the engine speed NE and the charging efficiency η as inputs. More specifically, when the engine speed NE is relatively high, the CPU 72 sets the determination value Δ to a smaller value than when the engine speed NE is relatively low. Also, when the charging efficiency η is relatively large, the CPU 72 sets the determination value Δ to be a larger value than when the charging efficiency η is relatively small. This process is accomplished by the CPU 72 executing map calculation on the determination value Δ when the ROM 74 stores, in advance, map data in which the engine speed NE and the charging efficiency η are input variables and the determination value Δ is an output variable.

If the CPU 72 determines that the rotation fluctuation amount ΔT30[0] is greater than the determination value Δ (S62: YES), the CPU 72 proceeds to the process of S48. If the CPU 72 determines that the rotation fluctuation amount ΔT30[0] is less than or equal to the determination value Δ (S62: NO), the CPU 72 proceeds to the process of S50.

When the process of S56 or S58 is completed or a negative determination is made in the process of S30, S50, or S60, the CPU 72 temporality ends the series of the processes shown in FIG. 3. When the negative determination is made in the process of S60, the rotation fluctuation amount ΔT30[0] is related to the cylinder #1, which is undergoing the fuel cutoff process. Therefore, the CPU 72 does not execute the process for determining whether a misfire has occurred.

The operation and advantages of the present embodiment will now be described.

When the deposition amount DPM is greater than or equal to a threshold value DPMth, the CPU 72 executes the regeneration process on the GPF 34. As a result, the air drawn into the cylinder #1 during an intake stroke is not used for combustion and is discharged to the exhaust passage during an exhaust stroke of the cylinder #1. In addition, the air-fuel mixture in the cylinders #2 to #4 is richer than the stoichiometric air-fuel ratio, and the emissions discharged from the cylinders #2 to #4 to the exhaust passage 30 contain a large amount of unburned fuel. The oxygen and unburned fuel discharged to the exhaust passage 30 is used, for example, for combustion of the three-way catalyst 32 to increase the temperature of the GPF 34. The oxygen in the air discharged to the exhaust passage 30 oxidizes the PM in the GPF 34. As a result, the PM is burned and removed.

When executing the regeneration process, the CPU 72 determines whether a misfire has occurred based on comparison of the rotation fluctuation amount ΔT30[0] related to the cylinder #4 and the determination value Δ. Thus, even when the regeneration process causes the rotation fluctuation amount ΔT30[2], which corresponds to the preceding 360° C.A, to be equivalent to a rotation fluctuation amount obtained during occurrence of a misfire, this will not affect the determination of whether a misfire has occurred.

The present embodiment described above further obtains the following operation and advantages.

(1) The CPU 72 executes the regeneration process on the condition that the engine torque instruction value Te* is greater than or equal to the predetermined value Teth. When the internal combustion engine 10 produces a relatively large amount of torque, fluctuation increases in torque having a period that is less than or equal to the interval between appearances of compression top dead center. Accordingly, the effect of the tolerance on the value of the rotation fluctuation amount ΔT30[0] is relatively reduced. Thus, even when the value of the rotation fluctuation amount ΔT30[0] is directly compared with the determination value Δ to determine whether a misfire has occurred, the misfire determination will be made with high accuracy.

Second Embodiment

A second embodiment will be described below with reference to the drawings. The differences from the first embodiment will mainly be discussed.

In the present embodiment, when determining whether a misfire has occurred in the cylinder #4, a value relative to a rotation fluctuation amount $\Delta T30[1]$, which corresponds to the preceding 180° C.A, is compared with a determination value. In this case, the tolerance differently affects the rotation fluctuation amount $\Delta T30[1]$ and the rotation fluctuation amount $\Delta T30[0]$, the difference in the effect of the tolerance between the rotation fluctuation amount $\Delta T30[1]$ and the rotation fluctuation amount $\Delta T30[0]$ is learned.

Figure 5:
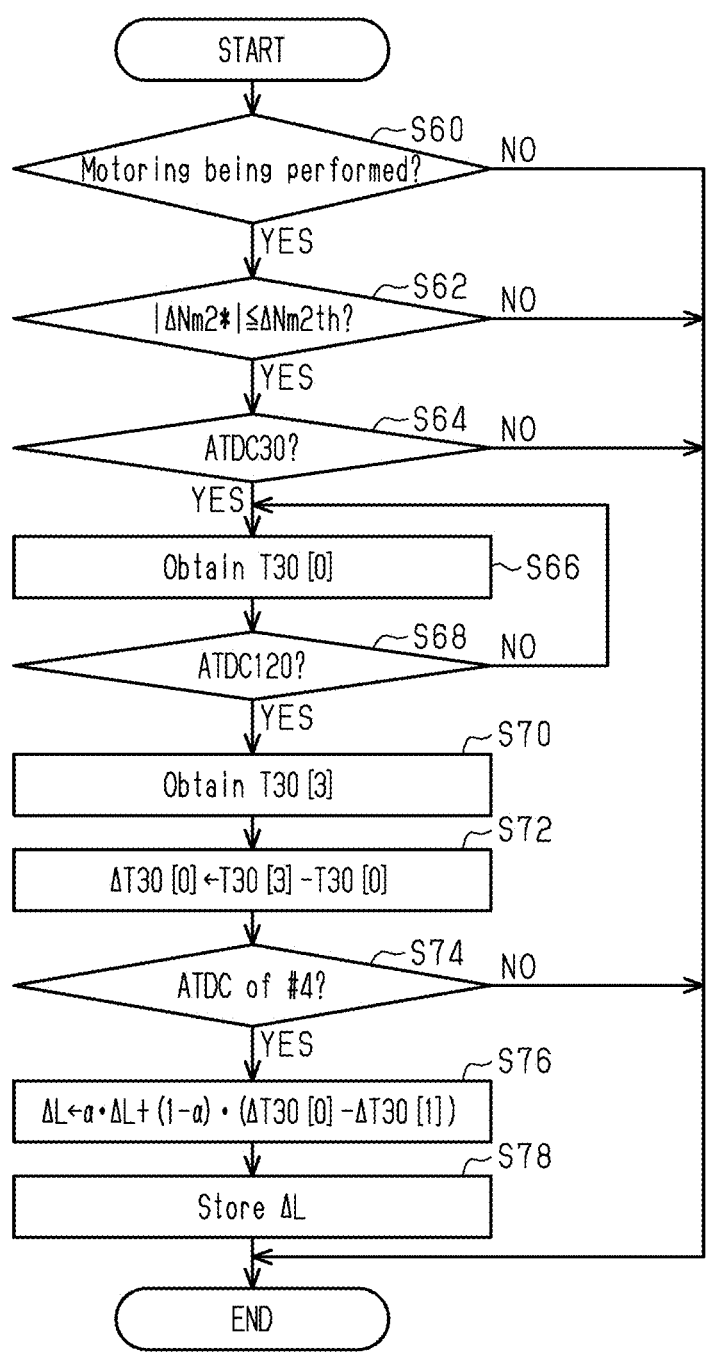
FIG. 5 is a flowchart showing the procedure of a process related to tolerance learning according to a second embodiment.

FIG. 5 shows the procedure of a process related to the above-described learning. The process shown in FIG. 5 is implemented by the CPU 72, for example, repeatedly executing a program stored in the ROM 74 in a predetermined cycle.

In a series of the processes shown in FIG. 5, the CPU 72 first determines whether the combustion control of the internal combustion engine 10 is stopped and the crankshaft 26 is being rotated by the first motor generator 52 and the second motor generator 54, that is, whether motoring is being performed (S60). If the CPU 72 determines that motoring is being performed (S60: YES), the CPU 72 determines whether the absolute value of a change amount $\Delta Nm2^*$ per unit time of a second speed instruction value $Nm2^*$, which is an instruction value of rotation speed Nm2 of the rotation shaft 54a of the second motor generator 54, is less than or equal to a threshold value $\Delta Nm2th$ (S62). The threshold value $\Delta Nm2th$ is set to a value at which changes in the low frequency component of rotation speed of the crankshaft 26 are negligible. In this specification, the low frequency component refers to a frequency of one or more rotations.

If the CPU 72 determines that the absolute value of the change amount $\Delta Nm2^*$ is less than or equal to the threshold value $\Delta Nm2th$ (S62: YES), the CPU 72 executes the processes of S64 to S72 in the same manner as the processes of S30 to S38. Then, the CPU 72 determines whether the cylinder #4 is in the ATDC period (S74). If the CPU 72 determines that the cylinder #4 is in the ATDC period (S74: YES), the CPU 72 updates a learning value $\Delta L$ by executing an exponential moving average process on a value obtained by subtracting the rotation fluctuation amount $\Delta T30[1]$, which corresponds to the preceding 180° C.A, from the rotation fluctuation amount $\Delta T30[0]$ (S76). More specifically, the CPU 72 assigns the sum of a value obtained by multiplying the subtracted value by a coefficient "1-α" and a value obtained by multiplying the learning value $\Delta L$ by a coefficient "α" to the learning value $\Delta L$. The CPU 72 stores the learning value $\Delta L$ in the storage device 75 (S78).

When the process of S78 is completed or a negative determination is made in the process of S60, S62, S64, or S74, the CPU 72 temporarily ends the series of the processes shown in FIG. 5.

Figure 6:
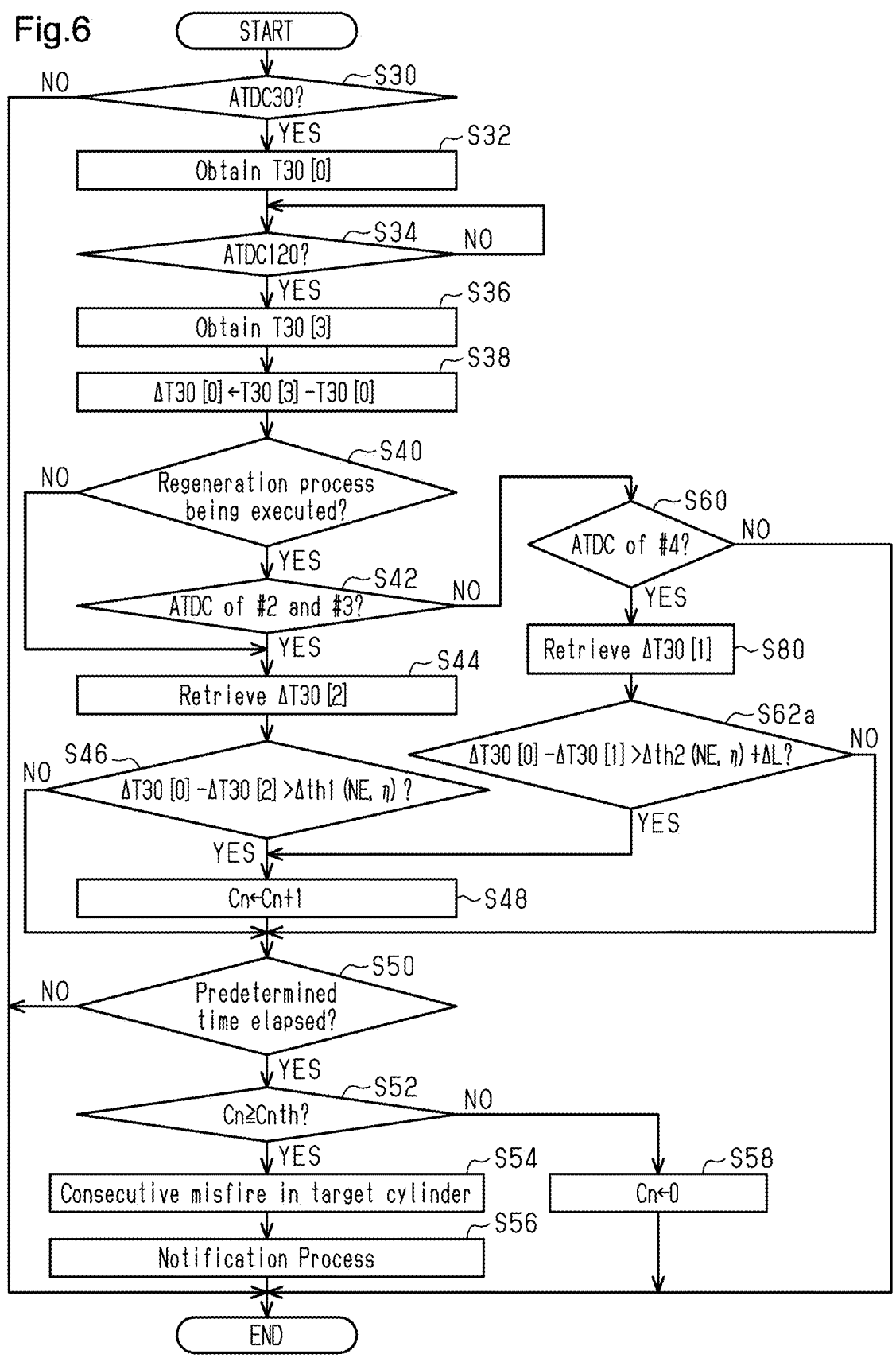
FIG. 6 is a flowchart showing the procedure of a process related to misfire detection according to the second embodiment.

FIG. 6 shows the procedure of a process related to a misfire in the present embodiment. The process shown in FIG. 6 is implemented by the CPU 72, for example, repeatedly executing a program stored in the ROM 74 in a predetermined cycle. For the sake of convenience, in FIG. 6, the same step numbers are given to the processes corresponding to those in FIG. 3.

In the process shown in FIG. 6, if an affirmative determination is made in the process of S60 (S60: YES), the CPU 72 retrieves the rotation fluctuation amount $\Delta T30[1]$ corresponding to the preceding 180° C.A (S80). The rotation fluctuation amount $\Delta T30[1]$ is related to the cylinder #3. The CPU 72 determines whether a value obtained by subtracting the rotation fluctuation amount $\Delta T30[1]$ from the rotation fluctuation amount $\Delta T30[0]$, which is related to the subject of the misfire determination, is greater than a value obtained by adding the learning value $\Delta L$ to the determination value $\Delta th2$ (S62a). The value obtained by subtracting the rotation fluctuation amount $\Delta T30[1]$ from the rotation fluctuation amount $\Delta T30[0]$ is approximately equal to the learning value $\Delta L$ during the motoring. Thus, the determination value $\Delta th2$, which has been corrected by addition of the learning value $\Delta L$ to the determination value $\Delta th2$ to reflect the effect of the tolerance and the like, is compared to the relative value of the rotation fluctuation amount $\Delta T30[0]$ to the rotation fluctuation amount $\Delta T30[1]$.

The determination value $\Delta th2$ is set to a value obtained by subtracting the rotation fluctuation amount $\Delta T30[1]$ from the rotation fluctuation amount $\Delta T30[0]$ when it is assumed that there is no tolerance and a misfire occurs. In the present embodiment, the determination value $\Delta th2$ is adapted separately from the determination value $\Delta th1$. This setting is based on consideration that the difference between rotation fluctuation amounts that are separated from each other by 360° C.A is not necessarily equal to the difference between rotation fluctuation amounts that are separated from each other by 180° C.A due to a difference in friction or the like caused by, for example, the geometric layout of the cylinders in the internal combustion engine 10.

The CPU 72 variably sets the determination value $\Delta th2$ using the engine speed NE and the charging efficiency η as inputs. More specifically, when the engine speed NE is relatively high, the CPU 72 sets the determination value $\Delta th2$ to a smaller value than when the engine speed NE is relatively low. Also, when the charging efficiency η is relatively large, the CPU 72 sets the determination value $\Delta th2$ to be a larger value than when the charging efficiency η is relatively small. This process is accomplished by the CPU 72 executing map calculation on the determination value $\Delta th2$ when the ROM 74 stores, in advance, map data in which the engine speed NE and the charging efficiency η are input variables and the determination value $\Delta th2$ is an output variable.

If an affirmative determination is made in the process of S62a, the CPU 72 proceeds to the process of S48. If a negative determination is made in the process of S62a, the CPU 72 proceeds to the process of S50.

As described above, in the present embodiment, the learning value $\Delta L$ is used to determine whether a misfire has occurred while limiting the effect of the tolerance.

Third Embodiment

A third embodiment will be described below with reference to the drawings. The differences from the first embodiment will mainly be discussed.

In the present embodiment, in the regeneration process, the cylinder that undergoes the fuel cutoff process is changed in each combustion cycle.

Figure 7:
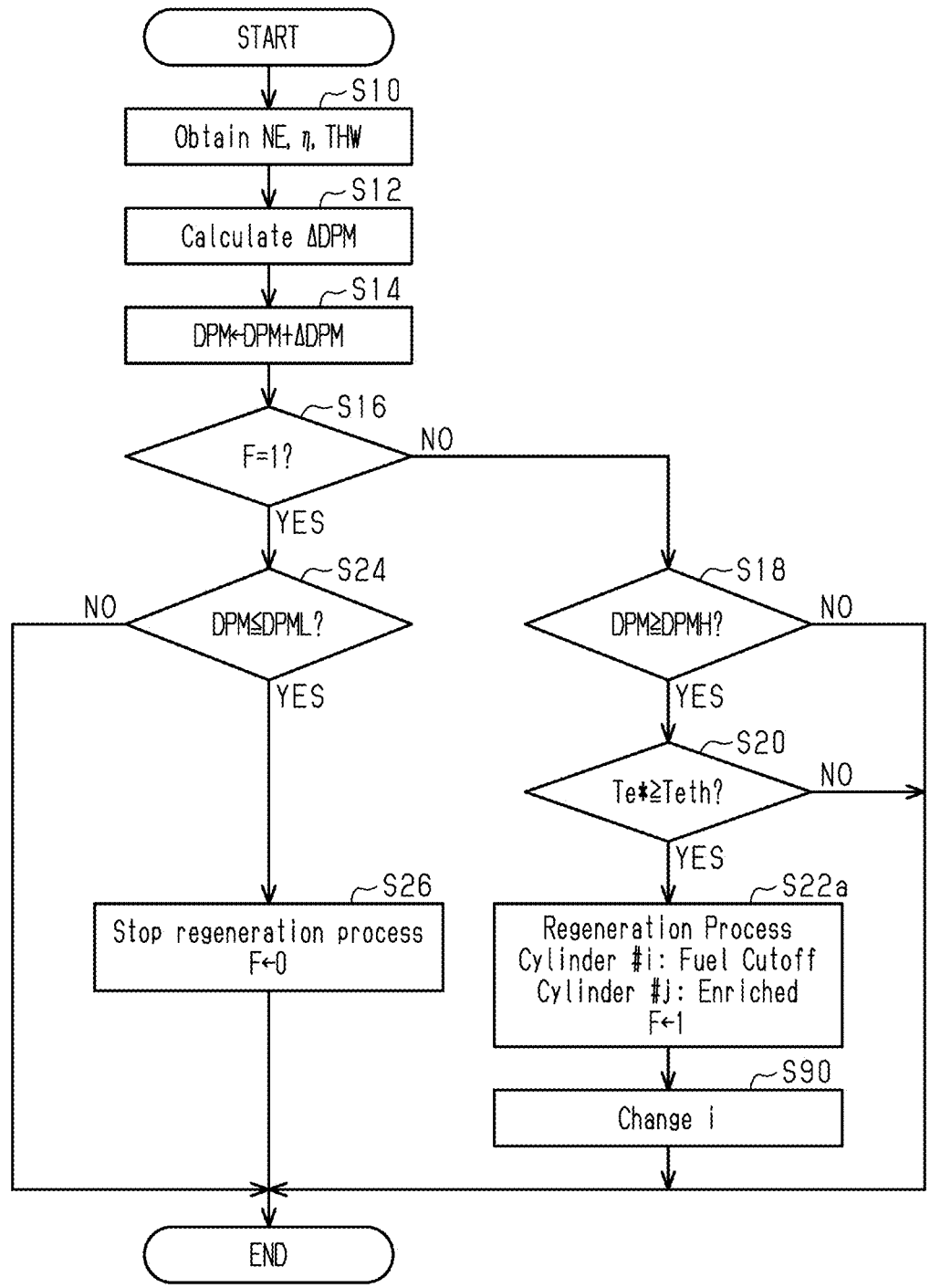
FIG. 7 is a flowchart showing the procedure of a process related to gasoline particulate filter (GPF) regeneration according to a third embodiment.

FIG. 7 shows the procedure of a process related to the regeneration process. The process shown in FIG. 7 is implemented by the CPU 72, for example, repeatedly executing a program stored in the ROM 74 in each combustion cycle. For the sake of convenience, in FIG. 7, the same step numbers are given to the processes corresponding to those in FIG. 2.

In a series of the processes shown in FIG. 7, if an affirmative determination is made in the process of S20, the CPU 72 sets a variable i to any one of 1 to 4 to execute the fuel cutoff process on the cylinder #i and sets the air-fuel ratio of the remaining cylinders #j to be richer than the stoichiometric air-fuel ratio to execute the regeneration process (S22a). The CPU 72 changes the variable i (S90). When the process of S90 is completed, the CPU 72 temporarily ends the series of the processes shown in FIG. 7.

In this configuration, in a process for determining consecutive misfires in a single cylinder, the process of S60 is changed from the process for determining whether the cylinder #4 is in the ATDC period to a process for determining whether the cylinder subsequent to the cylinder #i by 360° C.A is in the ATDC period. In addition, the process of S42 is changed from the process for determining whether the cylinders #2 and #3 are in the ATDC period to a process for determining whether the cylinders excluding two cylinders, that is, the cylinder #i and the cylinder subsequent to the cylinder #i by 360° C.A, are in the ATDC period.

Further, in the present embodiment, a process for determining a random misfire such that the number of misfires in various cylinders is increased in a predetermined period is executed as follows.

FIG. 8 shows the procedure of a process related to the random misfire determination. The process shown in FIG. 8 is implemented by the CPU 72, for example, repeatedly executing a program stored in the ROM 74 in a predetermined cycle. For the sake of convenience, in FIG. 8, the same step numbers are given to the processes corresponding to those in FIG. 3.

In a series of the processes shown in FIG. 8, if an affirmative determination is made in the process of S40, the CPU 72 determines whether the cylinder #i, that is, a fuel cutoff cylinder, is in the ATDC period (S100). If the CPU 72 determines that the cylinder #i is not in the ATDC period (S100: NO), the CPU 72 determines whether the preceding 720° C.A corresponds to the fuel cutoff cylinder (S102). If the CPU 72 determines that the preceding 720° C.A does not correspond to the fuel cutoff cylinder (S102: NO), the CPU 72 retrieves the rotation fluctuation amount $\Delta T30[4]$ corresponding to the preceding 720° C.A (S104). The CPU 72 determines whether a value obtained by subtracting the rotation fluctuation amount $\Delta T30[4]$ from the rotation fluctuation amount $\Delta T30[0]$, which is related to the subject of the determination, is greater than a determination value $\Delta th3$ (S46b).

Here, instead of the value of the rotation fluctuation amount $\Delta T30[0]$ being compared with the determination value, a relative value of the rotation fluctuation amount $\Delta T30[0]$ to the rotation fluctuation amount $\Delta T30[4]$ is compared with the determination value $\Delta th3$. This eliminates effects caused by, for example, the tolerance of intervals between the teeth 42 of the crank rotor 40. More specifically, the rotation fluctuation amount $\Delta T30[0]$ and the rotation fluctuation amount $\Delta T30[4]$ are obtained at an interval of 720° C.A and thus are calculated with reference to the same tooth 42. Therefore, even if the intervals of the teeth 42 have a tolerance, the tolerance equally affects the rotation fluctuation amount $\Delta T30[0]$ and the rotation fluctuation amount $\Delta T30[4]$. When the relative value of the rotation fluctuation amount $\Delta T30[0]$ to the rotation fluctuation amount $\Delta T30[4]$ is compared with the determination value $\Delta th2$, the effect of the tolerance is limited. The rotation fluctuation amount $\Delta T30[4]$ is used instead of the rotation fluctuation amount $\Delta T30[2]$ because it is correct to consider that the period of torque fluctuation of the internal combustion engine 10 is one combustion cycle based on, for example, the difference in the geometric layout of the cylinders #1 to #4. The rotation fluctuation amount $\Delta T30[0]$ and the rotation fluctuation amount $\Delta T30[4]$ correspond to the same cylinder that is the subject of the misfire determination. Therefore, in the present embodiment, when detecting consecutive misfires of a single cylinder, the rotation fluctuation amount $\Delta T30[0]$ is compared with the rotation fluctuation amount $\Delta T30[2]$ instead of the rotation fluctuation amount $\Delta T30[4]$.

The CPU 72 variably sets the determination value $\Delta th3$ using the engine speed NE and the charging efficiency η as inputs. More specifically, when the engine speed NE is relatively high, the CPU 72 sets the determination value $\Delta th3$ to a smaller value than when the engine speed NE is relatively low. Also, when the charging efficiency η is relatively large, the CPU 72 sets the determination value $\Delta th3$ to be a larger value than when the charging efficiency η is relatively small. This process is accomplished by the CPU 72 executing map calculation on the determination value $\Delta th3$ when the ROM 74 stores, in advance, map data in which the engine speed NE and the charging efficiency η are input variables and the determination value $\Delta th3$ is an output variable.

If the CPU 72 determines that the preceding 720° C.A corresponds to the fuel cutoff cylinder (S102: YES), the CPU 72 retrieves the rotation fluctuation amount $\Delta T30[2]$, which corresponds to the preceding 360° C.A (S106). The CPU 72 determines whether the value obtained by subtracting the rotation fluctuation amount $\Delta T30[2]$ from the rotation fluctuation amount $\Delta T30[0]$ is greater than a determination value $\Delta th4$ (S62b). More specifically, when the rotation fluctuation amount $\Delta T30[4]$ is related to the fuel cutoff cylinder, the rotation fluctuation amount $\Delta T30[2]$ is used instead of the rotation fluctuation amount $\Delta T30[4]$.

The CPU 72 variably sets the determination value $\Delta th4$ using the engine speed NE and the charging efficiency η as inputs. More specifically, when the engine speed NE is relatively high, the CPU 72 sets the determination value $\Delta th4$ to a smaller value than when the engine speed NE is relatively low. Also, when the charging efficiency η is relatively large, the CPU 72 sets the determination value $\Delta th4$ to be a larger value than when the charging efficiency η is relatively small. This process is accomplished by the CPU 72 executing map calculation on the determination value $\Delta th4$ when the ROM 74 stores, in advance, map data in which the engine speed NE and the charging efficiency η are input variables and the determination value $\Delta th4$ is an output variable.

If an affirmative determination is made in the process of S46b or S62b, the CPU 72 proceeds to the process of S48. If a negative determination is made in the process of S46b or S62b, the CPU 72 proceeds to the process of S50.

If the CPU 72 determines that a predetermined period has elapsed (S50: YES), the CPU 72 determines whether a counter C is greater than or equal to a threshold value Cth (S52b). If the CPU 72 determines that the counter C is greater than or equal to the threshold value Cth, the CPU 72 determines that random misfires have frequently occurred (S54b) and proceeds to the process of S56. If the CPU 72 determines that the counter C is less than the threshold value Cth (S52: NO), the CPU 72 initializes the counter C (S58b) and then temporarily ends the series of the processes shown in FIG. 8.

Correspondence

Correspondence between the items in the embodiments described above and the items described in "SUMMARY" is as follows. Hereinafter, the correspondence is shown with each number of the aspects described in "SUMMARY".

[1,10] The stopping process corresponds to the processes of S22 and S22a. The determination process corresponds to the processes of S46 to S54, S58, and S62 shown in FIG. 3, the processes of S46 to S54, S58, and S62a shown in FIG. 6, the processes of S46b, S48 to S50, S52b, S54b, S58b, and S62b shown in FIG. 8. The predetermined angular interval corresponds to 360° C.A in the processes of FIGS. 3 and 6 and 720° C.A in the process of FIG. 8. The instantaneous speed variable corresponds to time T30. The rotation fluctuation amount corresponds to the rotation fluctuation amount ΔT30.

[2] Aspect 2 corresponds to the process shown in FIG. 3.

[3] Aspect 3 corresponds to the process of S20.

[4,5] The learning process corresponds to the process of S76. The specified angular interval corresponds to 180° C.A. The determination process corresponds to the process shown in FIG. 6.

[6, 7] Aspects 6 and 7 correspond to the process shown in FIG. 8.

[8] Aspect 8 corresponds to the processes of S22a and S90.

OTHER EMBODIMENTS

The embodiments may be modified as follows. The embodiments and the following modified examples can be combined as long as the combined modified examples remain technically consistent with each other.

Instantaneous Speed variable

In the embodiments, an instantaneous speed variable is a variable indicating rotation speed of the crankshaft 26 in a crank angle range that is less than or equal to the interval between compression top dead centers. The crank angle range defining the instantaneous speed variable is set to 30° C.A. Instead, the crank angle range may be, for example, 10° C.A or the interval between compression top dead centers.

The instantaneous speed variable is not limited to an amount having a dimension of time and may be, for example, an amount having a dimension of speed.

Rotation Fluctuation Amount

In the embodiments, the rotation fluctuation amount ΔT30 is a difference between instantaneous speed variables that are separated by 90° C.A. Instead, for example, a difference between instantaneous speed variables that are separated by 60° C.A may be used.

The rotation fluctuation amount is not limited to a difference between instantaneous speed variables and may be a ratio of one of the instantaneous speed variables to the other.

Predetermined Angular Interval

In the processes shown in FIGS. 3 and 6, when the regeneration process is not executed, the rotation fluctuation amount ΔT30 corresponding to the preceding 360° C.A is subtracted from the target rotation fluctuation amount ΔT30 to limit the effect of the tolerance on the process for determining whether a misfire has occurred using the rotation fluctuation amount ΔT30. Instead, for example, a rotation fluctuation amount ΔT30 corresponding to the preceding 1080° C.A may be subtracted.

In the process shown in FIG. 8, when the regeneration process is not executed, the rotation fluctuation amount ΔT30 corresponding to the preceding 720° C.A is subtracted from the target rotation fluctuation amount ΔT30 to limit the effect of the tolerance on the process for determining whether a misfire has occurred using the rotation fluctuation amount ΔT30. Instead, for example, a rotation fluctuation amount ΔT30 corresponding to the preceding 1440° C.A may be subtracted. For example, the rotation fluctuation amount ΔT30 corresponding to the preceding 360° C.A may be subtracted. In other words, in the random misfire detection, a rotation fluctuation amount ΔT30 corresponding to an integer multiple of a combustion cycle does not necessarily have to be subtracted to eliminate the effect of the tolerance on the rotation fluctuation amount ΔT30. In this case, processes equivalent to FIGS. 3 and 6 may be executed in the random misfire detection.

Specified Angular Interval

In the process of S62a shown in FIG. 6, the rotation fluctuation amount ΔT30[1] corresponding to the preceding 180° C.A is subject to the relative comparison with the rotation fluctuation amount ΔT30[0]. Instead, for example, the rotation fluctuation amount ΔT30[3] corresponding to the preceding 480° C.A may be used. In another example, the rotation fluctuation amount ΔT30[6] corresponding to the preceding 1080° C.A may be used. In this case, the correction using the learning value ΔL may be omitted.

In the process of S62b shown in FIG. 8, the rotation fluctuation amount ΔT30[2] corresponding to the preceding 360° C.A is subject to the relative comparison with the rotation fluctuation amount ΔT30[0]. Instead, for example, the rotation fluctuation amount ΔT30[6] corresponding to the preceding 1080° C.A may be used. For example, the rotation fluctuation amount ΔT30[1] corresponding to the preceding 180° C.A or the rotation fluctuation amount ΔT30[3] corresponding to the preceding 480° C.A may be used. In this case, the determination value Δth4 is corrected using the learning value ΔL.

Learning Process

In the embodiments, the learning value ΔL is calculated by executing an exponential moving average process on the rotation fluctuation amount ΔT30. Instead, for example, the learning value ΔL may be a value obtained through a simple moving average process. Moreover, a moving average process does not necessarily have to be executed. For example, the latest rotation fluctuation amount ΔT30 calculated by the process of S72 may be the learning value ΔL.

Process for Eliminating Tolerance Effect from Misfire Determination Result

In the embodiments, the rotation fluctuation amount ΔT30 corresponding to the preceding 360° C.A is subtracted from the rotation fluctuation amount ΔT30 of the subject of the determination, which is an example of a process for subtracting a rotation fluctuation amount ΔT30 that differs from the rotation fluctuation amount ΔT30 of the subject of the determination from the rotation fluctuation amount ΔT30 of the subject of the determination. Instead, for example, the ratio of the rotation fluctuation amount ΔT30 of the subject of the determination to a rotation fluctuation amount ΔT30 that differs from the rotation fluctuation amount ΔT30 of the subject of the determination may be used.

Determination Value

In the embodiments, the determination values Δth1, Δth2, and Δ are variably set based on the engine speed NE and the charging efficiency η. Alternatively, for example, instead of the charging efficiency η, an accelerator depression amount may be used as the variable indicating the load of the internal combustion engine 10. For example, instead of executing the variable setting based on both of the variables indicating the engine speed NE and the load, the variable setting may be executed based on only one of the two variables. For example, the variable setting may be executed based on the water temperature THW and at least one of the two variables indicating the engine speed NE and the load.

In the process shown in FIG. 6, the same determination value may be used in the processes of S46 and S62a instead of using different determination values.

In the process shown in FIG. 8, the same determination value may be used in the processes of S46b and S62b instead of using different determination values.

Determination Process

The process of S62a shown in FIG. 6 may be replaced with a process that determines whether a value obtained by subtracting the rotation fluctuation amount $\Delta T30[1]$ and the learning value $\Delta L$ from the rotation fluctuation amount $\Delta T30[0]$ of the subject of the misfire determination is greater than the determination value $\Delta th2$. Alternatively, for example, the determination process may determine whether a value obtained by subtracting the rotation fluctuation amount $\Delta T30[1]$ and "$\Delta L/2$" from the rotation fluctuation amount $\Delta T30[0]$ is greater than a value obtained by adding "$\Delta L/2$" to the determination value $\Delta th2$.

Regeneration Process

The number of cylinders in which the combustion control is stopped is not limited to one. For example, the number of such cylinders may be two.

The air-fuel ratio of the air-fuel mixture in a cylinder on which the combustion control is continuously executed does not necessarily have to be rich. For example, when an adding valve is provided to add fuel to the exhaust passage 30 and used in the regeneration process, the cylinder may have the stoichiometric air-fuel ratio.

Stopping Process

The stopping process is not limited to the regeneration process. The stopping process may be, for example, a process that stops the supply of fuel to some of the cylinders in order to adjust output of the internal combustion engine 10. The stopping process may be, for example, a process that stops the combustion control of a cylinder when the cylinder has an anomaly. The stopping process may be, for example, a process that stops the combustion control of some of the cylinders and executes control so that the air-fuel mixture of the remaining cylinders is set to the stoichiometric air-fuel ratio when the oxygen storage amount of the three-way catalyst 32 is less than or equal to a specified value.

Reflection of Misfire Determination Result

In the embodiments, when it is determined that a misfire has occurred, the notification process is executed using the warning light 100. However, the notification process is not limited to a process that operates a device configured to output visual information and may be, for example, a process that operates a device configured to output auditory information.

Moreover, the misfire determination result does not necessarily have to be used in the notification process. For example, when a misfire has occurred, a process may be executed to change the control of the internal combustion engine 10 to a running state that inhibits occurrence of a misfire.

Deposition Amount Estimation

The process for estimating the deposition amount DPM is not limited to that shown in FIG. 2. The deposition amount DPM may be estimated, for example, based on the intake air amount Ga and a difference in pressure between the upstream side and the downstream side of the GPF 34. More specifically, when the pressure difference is relatively large, the deposition amount DPM is estimated to have a greater value than when the pressure difference is relatively low. If the pressure difference is constant, when the intake air amount Ga is relatively small, the deposition amount DPM may be estimated to have a greater value than when the intake air amount Ga is relatively large. When it is assumed that the pressure of the downstream side of the GPF 34 is a fixed value, the pressure Pex described above may be used instead of the pressure difference.

Post-Processing Device

The GPF 34 is not limited to a filter supporting a three-way catalyst and may be only a filter. The GPF 34 is not limited to one arranged downstream of the three-way catalyst 32 in the exhaust passage 30. The post-processing device does not necessarily have to include the GPF 34. For example, even when the post-processing device includes only the three-way catalyst 32, execution of the processes described in the embodiments and modified examples described above is advantageous if the temperature of the post-processing device needs to be increased during the regeneration process.

Controller

The controller is not limited to a device that includes the CPU 72 and the ROM 74 and executes software processes. For example, a dedicated hardware circuit (e.g., ASIC) configured to process at least some of the software processes executed in the embodiments may be provided. More specifically, the controller may have any of the following configurations (a) to (c). Configuration (a) includes a processor that executes all of the above-described processes according to programs and a program storage device such as a ROM that stores the programs. Configuration (b) includes a processor that executes some of the above-described processes in accordance with programs, a program storage device, and a dedicated hardware circuit that executes the remaining processes. Configuration (c) includes a dedicated hardware circuit that executes all of the above-described processes. Multiple software execution devices each including a processor and a program storage device and multiple dedicated hardware circuits may be provided. That is, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Vehicle

The vehicle is not limited to a series-parallel hybrid vehicle and may be, for example, a parallel hybrid vehicle or a series hybrid vehicle. Moreover, the vehicle is not limited to a hybrid vehicle and may be, for example, a vehicle in which the internal combustion engine 10 is the only power generator of the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device for an internal combustion engine including cylinders, the misfire detection device comprising: processing circuitry, wherein the processing circuitry is configured to execute
- a stopping process that stops combustion control of an air-fuel mixture in one or more of the cylinders, and
- a determination process that determines whether a misfire has occurred based on a value of a determination subject rotation fluctuation amount, wherein the determination subject rotation fluctuation amount is a rotation fluctuation amount related to a determination subject cylinder, which is one of the cylinders that is subject to determination of whether a misfire has occurred, wherein
- a comparison subject rotation fluctuation amount is a rotation fluctuation amount corresponding to a crank angle that is separated by a predetermined angular interval from a crank angle corresponding to the determination subject rotation fluctuation amount,
- the determination process includes
  - a process that determines whether a misfire has occurred based on a relative value of the determination subject rotation fluctuation amount to the comparison subject rotation fluctuation amount, and
  - a process that determines whether the misfire has occurred based on a value of the determination subject rotation fluctuation amount instead of based on the relative value of the determination subject rotation fluctuation amount to the comparison subject rotation fluctuation amount when the predetermined angular interval equals an angular interval between a crank angle at which compression top dead center of the one or more of the cylinders appears and a crank angle at which compression top dead center of the determination subject cylinder appears during the stopping process,
- the predetermined angular interval is an integer multiple of an angular interval corresponding to one rotation of a crankshaft,
- the rotation fluctuation amount is a change amount of an instantaneous speed variable, and
- the instantaneous speed variable is a variable indicating speed of the crankshaft when rotating in a rotation angle range that is less than or equal to an interval between crank angles at which compression top dead center appears.

2. The misfire detection device according to claim 1, wherein the determination process includes a process that determines whether the misfire has occurred based on comparison of the value of the determination subject rotation fluctuation amount with a determination value when the predetermined angular interval equals an angular interval between a crank angle at which compression top dead center of the one or more of the cylinders appears and a crank angle at which compression top dead center of the determination subject cylinder appears during the stopping process.

3. The misfire detection device according to claim 2, wherein the processing circuitry is configured to execute the stopping process on condition that torque of the internal combustion engine is greater than or equal to a predetermined value.

4. The misfire detection device according to claim 1, wherein
- a specified angle rotation fluctuation amount is a rotation fluctuation amount corresponding to a crank angle that is separated by a specified angular interval from a crank angle corresponding to the determination subject rotation fluctuation amount,
- the determination process includes a process that determines whether the misfire has occurred based on comparison of a determination value with a relative value of the determination subject rotation fluctuation amount to the specified angle rotation fluctuation amount when the predetermined angular interval equals an angular interval between a crank angle at which compression top dead center of the one or more of the cylinders appears and a crank angle at which compression top dead center of the determination subject cylinder appears during the stopping process, and
- the specified angular interval is an integer multiple of an interval between crank angles at which compression top dead center appears and differs from an integer multiple of an angular interval corresponding to one rotation of the crankshaft.

5. The misfire detection device according to claim 4, wherein
- the processing circuitry is configured to execute a learning process when combustion control of the internal combustion engine is stopped and the crankshaft is rotating,
- a learning rotation fluctuation amount is a rotation fluctuation amount related to a cylinder, the compression top dead center of which appears at a crank angle that is separated by the predetermined angular interval from a crank angle at which compression top dead center of the one or more of the cylinders appears,
- a learning specified angle rotation fluctuation amount is a rotation fluctuation amount corresponding to a crank angle that is separated by the specified angular interval from a crank angle corresponding to the learning rotation fluctuation amount,
- the learning process includes learning a difference between the learning rotation fluctuation amount and the learning specified angle rotation fluctuation amount, and the determination process includes
- a correction process that corrects at least one of the determination value or the relative value of the determination subject rotation fluctuation amount to the specified angle rotation fluctuation amount in accordance with the difference learned by the learning process when the predetermined angular interval equals an angular interval between a crank angle at which compression top dead center of the one or more of the cylinders appears and a crank angle at which compression top dead center of the determination subject cylinder appears during the stopping process, and
- a process that determines whether the misfire has occurred based on comparison of the determination value with the relative value of the determination subject rotation fluctuation amount to the specified angle rotation fluctuation amount after the correction process is executed.

6. The misfire detection device according to claim 5, wherein
- the predetermined angular interval is an angular interval corresponding to one rotation of the crankshaft, and
- the specified angular interval is less than the predetermined angular interval.

7. The misfire detection device according to claim 1, wherein
- a specified angle rotation fluctuation amount is a rotation fluctuation amount corresponding to a crank angle that is separated by a specified angular interval from a crank angle corresponding to the determination subject rotation fluctuation amount,
- the determination process includes a process that determines whether the misfire has occurred based on comparison of a determination value with a relative value of the determination subject rotation fluctuation amount to the specified angle rotation fluctuation amount when the predetermined angular interval equals an angular interval between a crank angle at which compression top dead center of the one or more of the cylinders appears and a crank angle at which compression top dead center of the determination subject cylinder appears during the stopping process, and the specified angular interval is an angular interval that is an integer multiple of an angular interval corresponding to one rotation of the crankshaft and differs from the predetermined angular interval.

8. The misfire detection device according to claim 7, wherein
the predetermined angular interval is an angular interval corresponding to two rotations of the crankshaft, and
the specified angular interval is an angular interval corresponding to one rotation of the crankshaft.

9. The misfire detection device according to claim 8, wherein the stopping process includes a process that changes the one or more of the cylinders.

10. A misfire detection method for an internal combustion engine including cylinders, the misfire detection method comprising:
executing a stopping process that stops combustion control of an air-fuel mixture in one or more of the cylinders; and
executing a determination process that determines whether a misfire has occurred based on a determination subject rotation fluctuation amount, which is a rotation fluctuation amount related to a determination subject cylinder, which is one of the cylinders that is subject to determination of whether a misfire has occurred, wherein a comparison subject rotation fluctuation amount is a rotation fluctuation amount corresponding to a crank angle that is separated by a predetermined angular interval from a crank angle corresponding to the determination subject rotation fluctuation amount, the determination process includes
a process that determines whether a misfire has occurred based on a relative value of the determination subject rotation fluctuation amount to the comparison subject rotation fluctuation amount, and
a process that determines whether the misfire has occurred based on a value of the determination subject rotation fluctuation amount instead of based on the relative value of the determination subject rotation fluctuation amount to the comparison subject rotation fluctuation amount when the predetermined angular interval equals an angular interval between a crank angle at which compression top dead center of the one or more of the cylinders appears and a crank angle at which compression top dead center of the determination subject cylinder appears during the stopping process, the predetermined angular interval is an integer multiple of an angular interval corresponding to one rotation of a crankshaft, the rotation fluctuation amount is a change amount of an instantaneous speed variable, and the instantaneous speed variable is a variable indicating speed of the crankshaft when rotating in a rotation angle range that is less than or equal to an interval between crank angles at which compression top dead center appears.

* * * * *